US012683642B2

(12) United States Patent
Park

(10) Patent No.: US 12,683,642 B2
(45) Date of Patent: Jul. 14, 2026

(54) ACCESSORY CASE FOR ELECTRONIC DEVICE AND ELECTRONIC DEVICE COMPRISING SAME

(71) Applicant: Samsung Electronics Co., Ltd., Gyeonggi-do (KR)

(72) Inventor: Heejun Park, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 227 days.

(21) Appl. No.: 18/403,976

(22) Filed: Jan. 4, 2024

(65) Prior Publication Data

US 2024/0187031 A1      Jun. 6, 2024

Related U.S. Application Data

(63) Continuation of application No. PCT/KR2022/009076, filed on Jun. 24, 2022.

(30) Foreign Application Priority Data

Jul. 7, 2021      (KR) ........................ 10-2021-0089191

(51) Int. Cl.
*G06F 1/16* (2006.01)
*H04B 1/3888* (2015.01)
*H04M 1/02* (2006.01)

(52) U.S. Cl.
CPC ......... *H04B 1/3888* (2013.01); *G06F 1/1629* (2025.01); *H04M 1/0203* (2025.01)

(58) Field of Classification Search
CPC .......... G06F 1/1629; G06F 2200/1633; H04M 1/0203; A45C 11/002; A45C 11/003
See application file for complete search history.

(56) References Cited

U.S. PATENT DOCUMENTS

| | | | | |
|---|---|---|---|---|
| 7,621,550 | B1 * | 11/2009 | Boruff ...................... | B62H 1/02 |
| | | | | 280/293 |
| 9,101,188 | B2 * | 8/2015 | Magness ................ | A45C 11/00 |
| 9,134,808 | B2 * | 9/2015 | Siddiqui ............... | G06F 1/1669 |
| 2012/0013781 | A1 | 1/2012 | Yamagiwa | |
| 2018/0041237 | A1 * | 2/2018 | Mody .................... | A45C 11/00 |

(Continued)

FOREIGN PATENT DOCUMENTS

| | | | |
|---|---|---|---|
| JP | 2012-22481 A | 2/2012 |
| KR | 10-2009-0092622 A | 9/2009 |
| KR | 20-0451104 Y1 | 11/2010 |

(Continued)

OTHER PUBLICATIONS

Korean Office Action dated Oct. 16, 2025.

*Primary Examiner* — Adrian S Wilson
(74) *Attorney, Agent, or Firm* — CANTOR COLBURN LLP

(57) ABSTRACT

An electronic device according to an embodiment may include a housing having a display disposed on a front surface, and comprising a recess on a rear surface; and a stand rotatably coupled with the housing, the stand may include a stand body; and a protrusion protruding from at least one end of the stand body, and the housing may include a hooking portion which is restrained to the housing, as the stand rotates from a first state mounted in the recess to a second state and the protrusion is caught.

18 Claims, 16 Drawing Sheets

(56) References Cited

U.S. PATENT DOCUMENTS

2020/0214408  A1      7/2020  Shin

FOREIGN PATENT DOCUMENTS

| KR | 10-2010-0132332 | A | 12/2010 |
| KR | 20-2012-0004024 | U | 6/2012 |
| KR | 10-1266378 | B1 | 5/2013 |
| KR | 10-2013-0116565 | A | 10/2013 |
| KR | 20-2014-0002951 | U | 5/2014 |
| KR | 10-1469970 | B1 | 12/2014 |
| KR | 10-2016-0102106 | A | 8/2016 |
| KR | 10-1903232 | B1 | 10/2018 |
| KR | 10-2000677 | B1 | 7/2019 |

* cited by examiner

<FIRST STATE (100a)>

FRONT SURFACE (110a)

SECOND STATE (100b)

1600

ACCESSORY CASE FOR ELECTRONIC DEVICE AND ELECTRONIC DEVICE COMPRISING SAME

CLAIM OF PRIORITY

This application is a continuation of International Application No. PCT/KR2022/009076, which was filed on Jun. 24, 2022 and claims priority to Korean Patent Application No. 10-2021-0089191, filed on Jul. 7, 2021 in the Korean Intellectual Property Office, the disclosures of which are herein incorporated by reference.

TECHNICAL FIELD

One or more embodiments disclosed in this document relate to an accessory case of an electronic device and the electronic device including the same.

BACKGROUND

A portable electronic device may be dropped easily thus causing a damage. To prevent this, a protecting casing may be used to prevent the damage to the electronic device. Typically, a front surface and/or a rear surface of the electronic device may be protected by mounting a protective accessory casing. The accessory casing may come in different color and provide various functions. Some casings may include a leather material in the outer layer for luxurious appearance. However, during operation, the accessory case may be detached from the electronic device which can cause damage on the accessory case, thus requiring a replacement.

Some of the accessory casings may include a stand for supporting the electronic device at a desired angle. The stand structure accessory case may be physically connected to the casing using a single fastening means.

However, the accessory casing and the stand may be easily separated if they are connected using only one fastening structure when a force is applied from externally, in particular from the side.

Accordingly, there is a need for an improved single fastener and casing that would minimize damage the electronic device.

SUMMARY

According to certain embodiments disclosed in this document, if a force is exerted to the side of an accessory case or an electronic device equipped with a stand, the stand and the accessory case or the electronic device may not be easily separated according to the teachings of this invention.

An accessory case for protecting an electronic device including a protective cover, having a front surface and a rear surface, for receiving the electronic device in the front surface, the protecting cover further including a recess in the rear surface and at least one hooking portion at one end of the recess; and a stand rotatably and detachably coupled to the at least one hooking portion of the recess of the protective cover, the stand further including a stand body; and at least one protrusion protruding from at least one end of the stand body and rotatably engaging with the at least one hooking portion of the recess.

An electronic device including a housing having a display disposed on a front surface thereof and including a recess on a rear surface thereof, the recess including at least one hook portion; and a stand rotatably and detachably coupled to one end of the recess, wherein the stand further comprises, a stand body; and at least one protrusion protruding from at least one end of the stand body and rotatably engaging with the at least one hooking portion of the recess, thereby allowing the stand to rotate from a first state and a second state.

Also, according to certain embodiments, if force is applied vertically to the electronic device or the accessory case supported by the stand, the stand and the accessory case or the electronic device can be easily separated to avoid the damage.

BRIEF DESCRIPTION OF DRAWINGS

In relation to the descriptions of the drawings, the same or similar reference numerals may be used for the same or similar elements.

DETAILED DESCRIPTION

Hereinafter, certain embodiments of the present invention will be described with reference to the accompanying drawings. However, it should be understood that this is not intended to limit the present invention to specific embodiments, and includes various modifications, equivalents, and/ or alternatives of the embodiments of the present invention.

Figure 1:
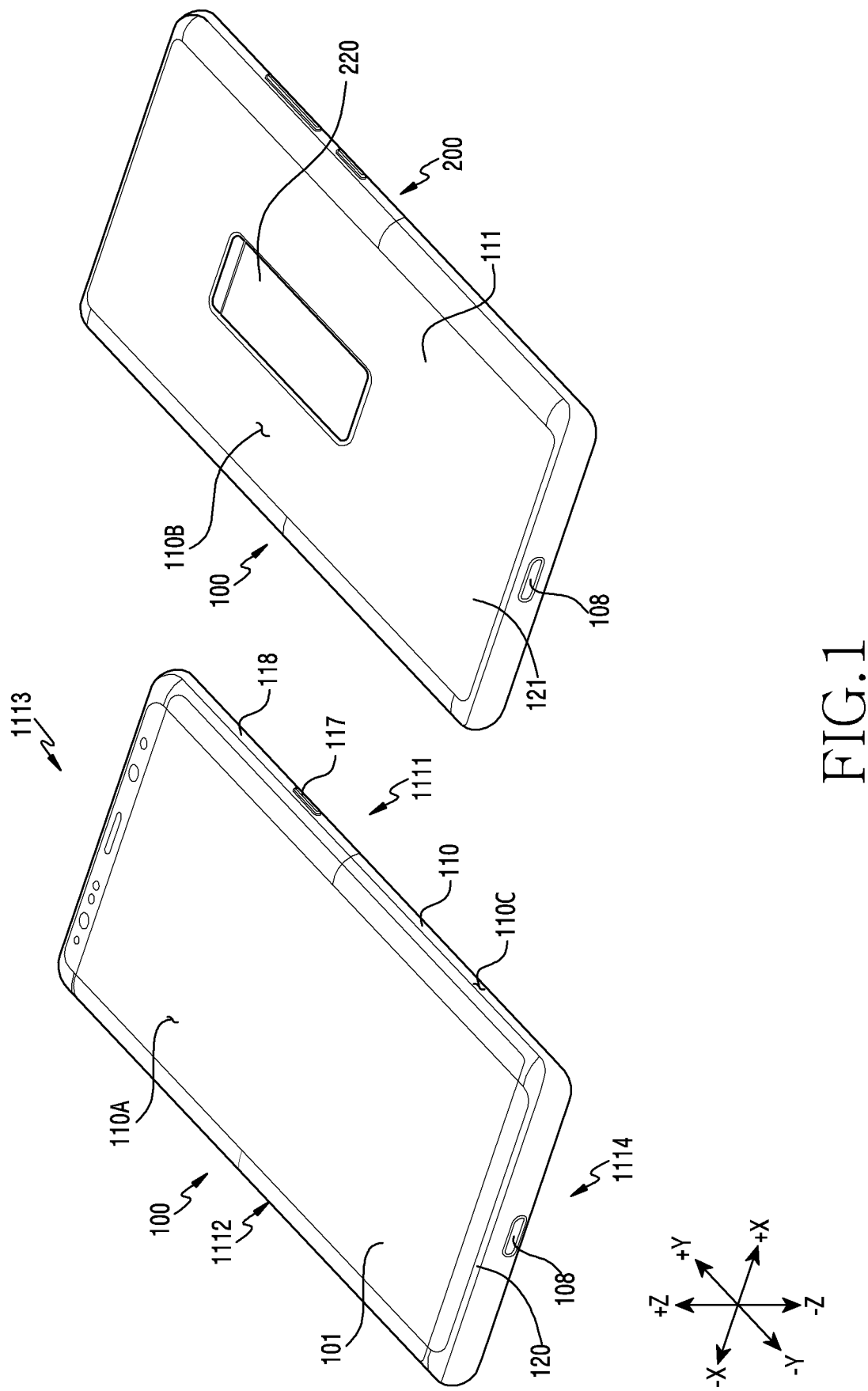
FIG. 1 is a diagram illustrating front and rear perspective views of an accessory case according to an embodiment.

FIG. 1 is a diagram illustrating front and rear perspective views of an accessory case according to an embodiment.

Referring to FIG. 1, an example in which an accessory case 100 is mounted on a bar-type electronic device 101 according to an embodiment of the present invention is disclosed, it should be noted that the teachings of invention can be applied to, but not limited to, a slidable, rollable, and foldable electronic device 101.

Referring to FIG. 1, the accessory case 100 according to an embodiment may include a protective cover 200 including a first surface (or a front surface) 110A, a second surface (or a rear surface) 110B, and a side surface (or a side wall) 110C surrounding a space between the first surface 110A and the second surface 110B. In another embodiment, the protective cover 200 may be integrated to form as a part of the first surface 110A, the second surface 110B, and the side surface 110C.

According to an embodiment, the first surface 110A may include a receiving portion for accommodating the electronic device 101. The electronic device 101 is accommodated in the receiving portion to enable the accessory case 100 to be mounted on the electronic device 101. According to an embodiment, at least a part of the first surface 110A may be formed by a substantially opaque and/or transparent front plate 120 (e.g., a polymer plate). The front plate 120 may be formed by surrounding edges of the first surface 110A.

In an embodiment, the second surface 110B may be formed by a substantially opaque and/or transparent rear plate 121. For example, the rear plate 121 may be formed of coated or tinted glass, ceramic, polymer, metal (e.g., aluminum, stainless steel (STS), or magnesium), or a combination of at least two of the materials.

According to an embodiment, a stand 220 may be mounted on the rear surface (or the second surface) 110B of the accessory case 100.

The side surface 110C may be formed by a side member (or, a side bezel structure or a sidewall) including metal and/or polymer by coupling with the front plate 120 and the rear plate 121.

As shown, the side surface 110C may include a first side surface 1111 positioned on a right side (e.g., in the +x direction of FIG. 1) of the accessory case 100 and extending along a first direction (e.g., the +y direction of FIG. 1), a second side surface 1112 parallel to the first side surface 1111 and extending along the first direction, a third side surface 1113 extending along a second direction (e.g., the +x direction of FIG. 1) perpendicular to the first direction and connecting one end of the first side surface 1111 (e.g., one end in the +y direction of FIG. 1) and one end of the second side surface 1112 (e.g., one end in the +y direction of FIG. 1), and/or a fourth side surface 1114 parallel to the third side surface 1113 and connecting the other end of the first side surface 1111 (e.g., one end in the −y direction of FIG. 1) and the other end of the second side surface 1112 (e.g., one end of the −y direction of FIG. 1).

According to an embodiment, the accessory case 100 may include at least one or more of a connector hole 108, a microphone hole or a speaker hole. Depending on design choice, accessory case 100 may omit at least one or additionally include other component. For example, the accessory case 100 may further include other openings not shown, for different applications. For example, the accessory case 100 may further include a camera hole (not shown) on the rear plate 121.

In operation, the connector hole 108 may receive a connector for transmitting and receiving power and/or data to and from an external electronic device (e.g., the electronic device 101 of FIG. 1), and/or a connector for transmitting and receiving an audio signal to and from the external electronic device.

Figure 2:
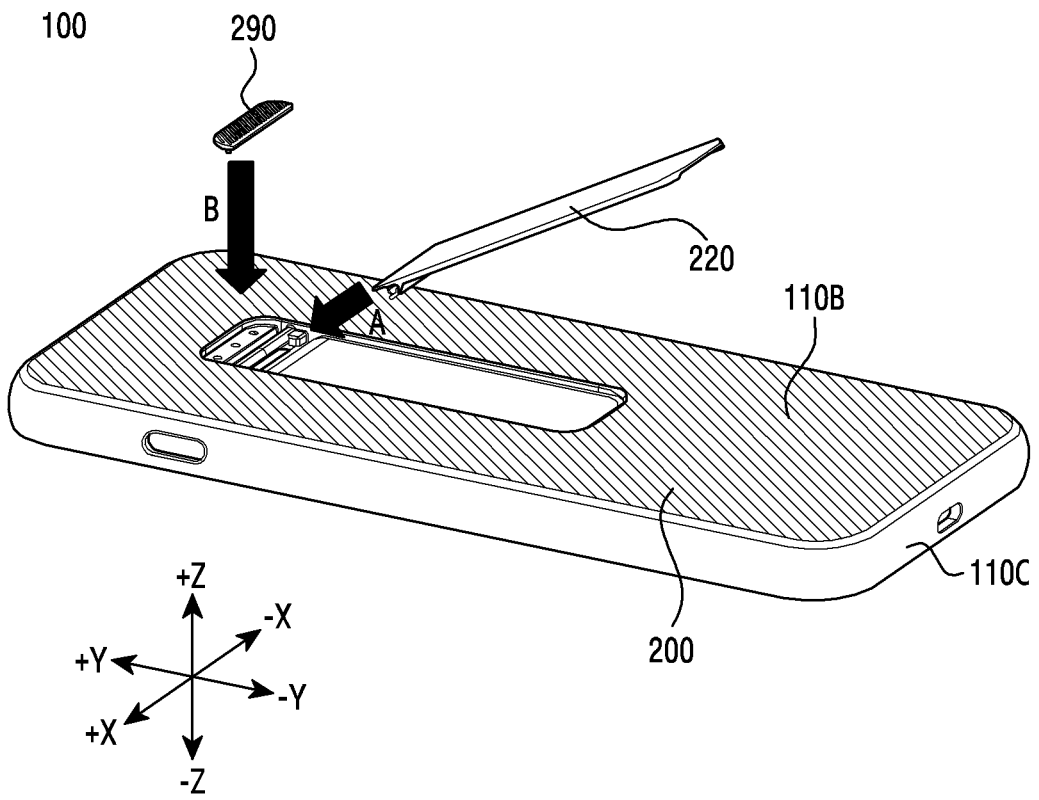
FIG. 2 is a diagram illustrating a rear perspective view of an accessory case according to an embodiment.

FIG. 2 is a diagram illustrating a rear perspective view of an accessory case according to an embodiment.

Referring to FIG. 2, an accessory case 100 may include a protective cover 200 and a stand 220, and may further include a stand cover 290.

According to an embodiment, the stand 220 and the stand cover 290 may be detachably coupled to the protective cover 200. For example, the stand 220 may be coupled in a first direction (e.g., in a direction A). According to an embodiment, the stand cover 290 may be coupled in a second direction (e.g., a direction B) toward the rear surface 110B of the protective cover.

According to an embodiment, the stand cover 290 serves to protect a coupling portion between the stand 220 and the protective cover 200. In addition, the stand cover 290 may serves to block or prevent any foreign substance entering from the rear surface 110B of the protective cover 200.

Hereinafter, the stand 220 and the coupling structure of the stand 220 and the protective cover 200 are explained in details with reference to FIG. 3 through FIG. 11.

Figure 3:
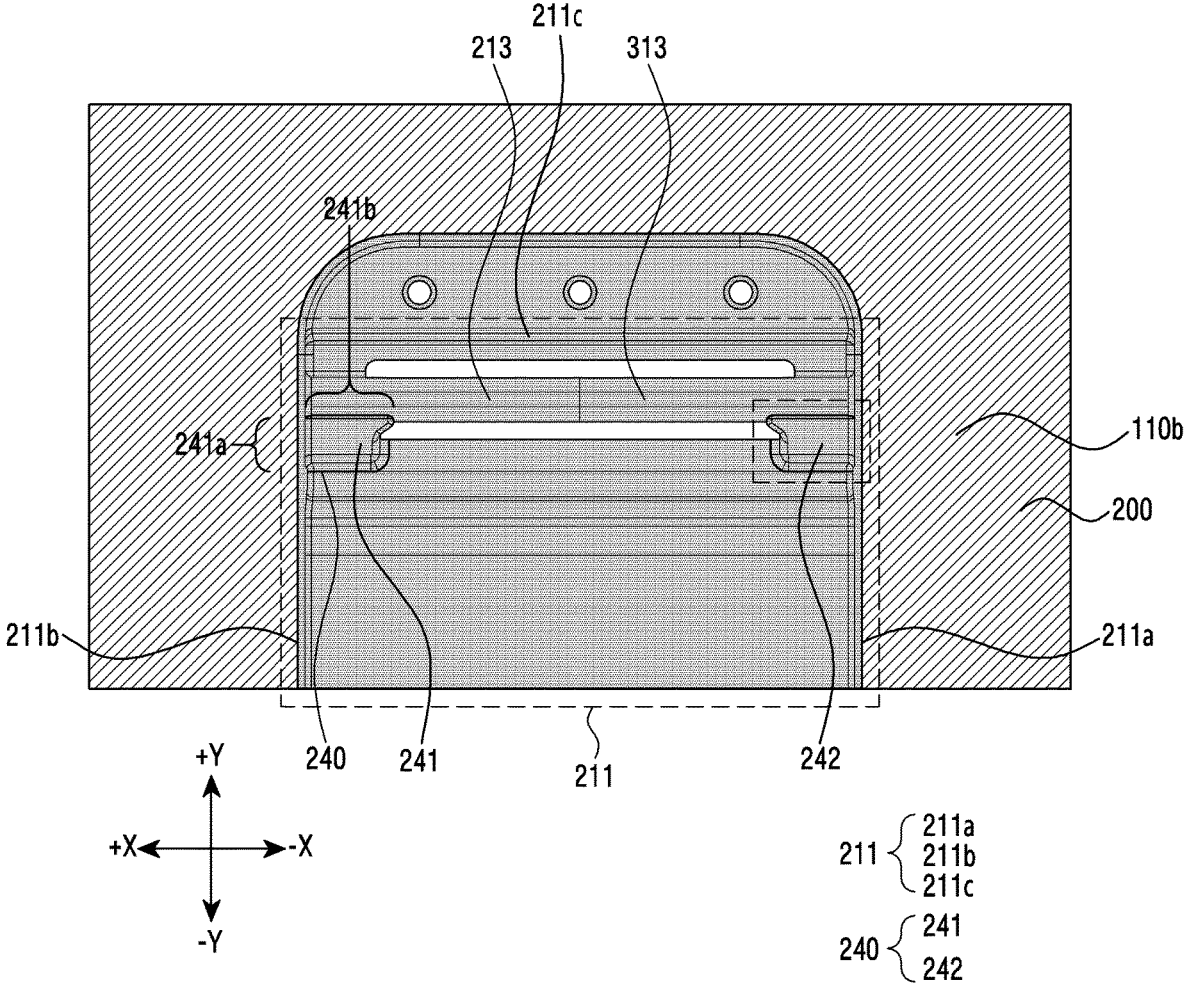
FIG. 3 is a diagram illustrating a rear view of a protective cover according to an embodiment.

FIG. 3 is a diagram illustrating a rear view of a protective cover according to an embodiment.

As shown, a protective cover 200 may include a recess 211, and a hooking portion 240. According to an embodiment, the protective cover 200 may further include a coupling portion, and the stand 220 and the protective cover 200 may be coupled through the coupling portion of the protective cover 200.

According to an embodiment, a first coupling member 213 may be disposed in the coupling portion of the protective cover 200. For example, the first coupling member 213 may include a bar 313. However, the first coupling member 213 is not limited to the bar 313. For example, a magnet for fixing the stand 220 of a metal material may be disposed in the first coupling member 213.

According to an embodiment, a recess 211 may be formed in the rear surface 110b of the protective cover 200, and the bar 313 may be formed by crossing a center of the recess 211.

According to another embodiment, the recess 211 may be replaced with another structure for accommodating the stand 220. For example, the recess 211 may be replaced with an opening for accommodating the stand 220.

According to an embodiment, the hooking portion 240 may be formed by extending from one surface of the recess 211. For example, the recess 211 may be formed in a rectangular cross section. The recess 211 of the rectangular cross section may include a first surface 211a, a second surface 211b parallel to the first surface 211a, and a third surface 211c perpendicular to the first surface 211a, and connecting one end of the first surface 211a and one end of the second surface 211b.

According to an embodiment, the bar 313 may be formed between the first surface 211a and the second surface 211b. For example, the bar 313 may disposed across the center portion of the recess 211 to connect the first surface 211a and the second surface 211b.

However, it should be noted that the cross section in which the recess 211 is formed is not limited to the rectangular cross section as shown. For example, the recess 211 may be formed in an elliptical or rhombic cross section.

According to an embodiment, the hooking portion 240 may be formed at the first surface 211a and the second surface 211b. The hooking portion 240 may include a first hooking portion 241 and a second hooking portion 242. For example, the hooking portion 240 may be formed by extending from the first surface 211a in the first direction (e.g., the +x direction), and the second hooking portion 242 may be formed by extending in the second direction (e.g., the −x direction). According to an embodiment, the hooking portion 240 may be formed symmetrically based on one axis (e.g., the y axis) of the recess 211. The hooking portion 240 may be formed adjacent to the bar 313. For example, the first surface 241a of the hooking portion 240 may face the recess 211, and the second surface 241b perpendicular to the first surface 241a of the hooking portion 240 may face the bar 313.

It should be noted that the position and the number of the hooking portion 240 and the bar 313 are not limited thereto as shown. For example, a plurality of bars 313 may be formed, and the hooking portion 240 may not be formed symmetrically. Alternatively, the hooking portion 240 may not face the bar 313.

According to an embodiment, the protective cover 200 may be formed of a plastic material. However, the material for forming the protective cover 200 is not limited thereto. For example, the protective cover 200 may be formed of a metal material (e.g., stainless steel). Alternatively, the protective cover 200 may be formed of a polymer material (e.g., polyurethane).

Figure 4:
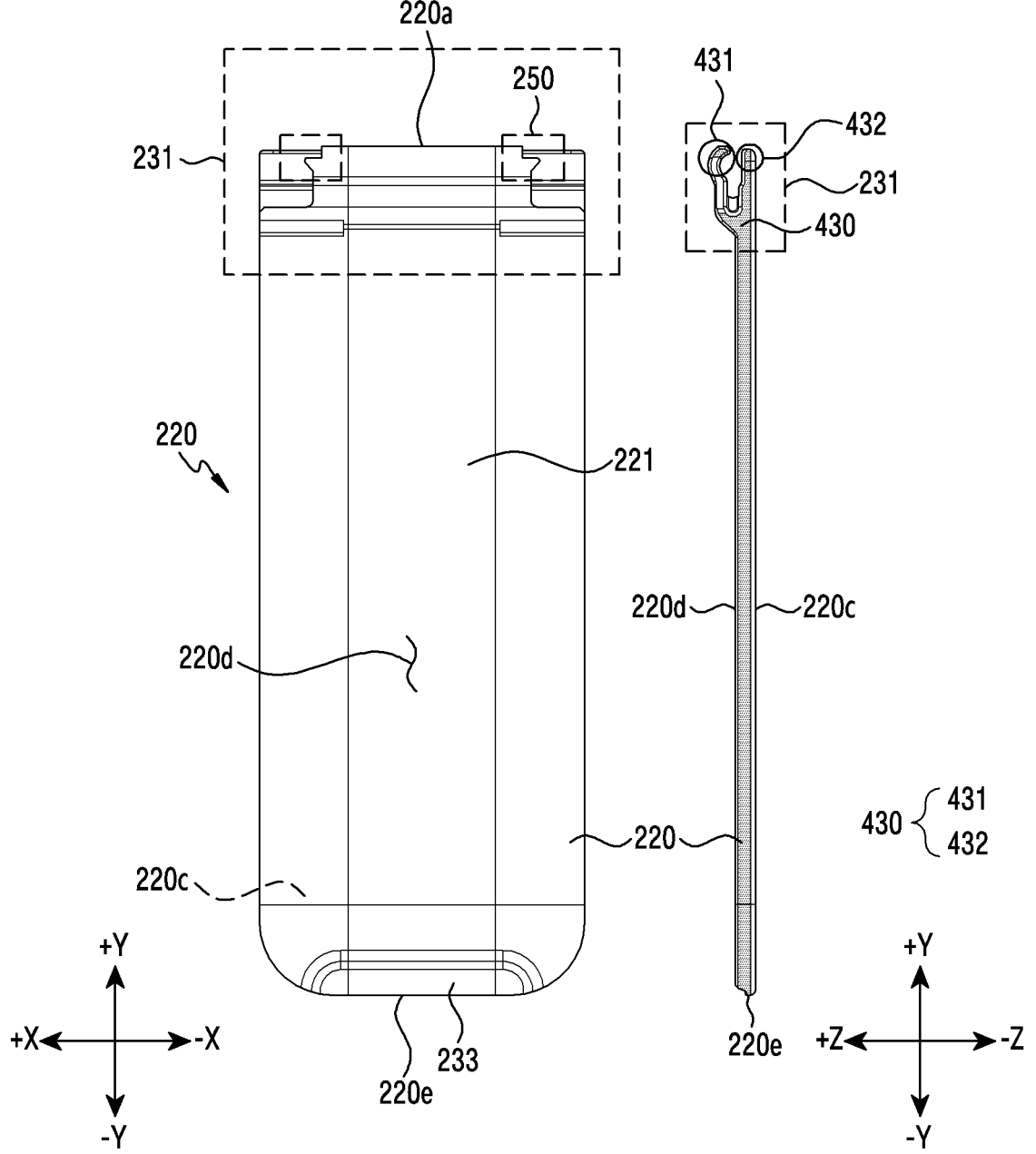
FIG. 4 is a diagram illustrating front and side views of a stand according to an embodiment.

FIG. 4 is a diagram illustrating front and side views of a stand according to an embodiment.

Referring to FIG. 4, a stand 220 may include a stand body 221 and a protrusion 250, and may further include a second coupling member 231.

According to an embodiment, the stand body 221 may be formed in a rectangular cross section and may include an upper surface 220a detachably connected to a protective cover (200 of FIG. 3), a side portion sharing edges with the upper surface 220a and forming a side surface of the stand body 221, an outer surface 220c exposed to outside of the accessory case 100 with the stand 220 mounted in the recess 211, an inner surface 220d opposite to the outer surface 220c and facing inwards the recess 211 when the stand 220 is mounted in the recess 211, and a lower surface 220e opposite to the upper surface 220a.

It should be noted that the cross section of the stand body 221 is not limited thereto. For example, the stand body 221 may be formed in a rhombic cross section.

According to an embodiment, the stand body 221 may include a coupling portion coupled with the protective cover 200. For example, the coupling portion may be formed on the upper surface 220a, the side surface, the inner surface 220d, or the outer surface 220c.

According to an embodiment, the coupling portion may include the second coupling member 231, and the second coupling member 231 may be formed by extending from the coupling portion of the stand body 221.

As shown, the second coupling member 231 may include a gripper 430. For example, the gripper 430 may be formed by extending from the coupling portion of the stand body 221, and the gripper 430 may include a first grip portion 431 and a second grip portion 432.

According to an embodiment, the first grip portion 431 may be formed by extending from the outer surface 220c in the first direction (e.g., the +y direction) toward the upper surface 220a, and the second grip portion 432 may be formed by extending in the first direction (e.g., +y direction) on the upper surface 220a.

However, the position and the direction of the first grip portion 431 or the second grip portion 432 are not limited thereto. For example, the second grip portion 432 may be formed by extending in the first direction (e.g., the +y direction) on the inner surface 220d.

According to an embodiment, the gripper 430 may be formed in a tongs shape. For example, the second grip portion 432 of the gripper 430 may be formed in a flat plate shape, and the first grip portion 431 may be formed in the tongs shape including a curve for picking up or rotatably coupling a circular shape.

It should be noted that the shape of the gripper 430 is not limited thereto. For example, the second grip portion 432 of the gripper 430 may be formed in a hook shape.

According to an embodiment, the protrusion 250 may be formed by protruding from at least one end of the stand body 221. For example, the protrusion 250 may be formed by extending from a side surface of the first grip portion 431 in the second direction (e.g., the +x direction or the −x direction) perpendicular to the first direction (e.g., the +y direction). According to an embodiment, the protrusion 250 may be formed symmetrically based on a first axis (e.g., the y axis) of the stand 220.

However, the position and the number of the protrusion 250 are not limited thereto. For example, a single protrusion 250 may be formed. According to another example, the protrusion 250 may be formed by extending from a side portion of the stand body 221.

Further, the stand 220 may be formed of a plastic material. However, the material for forming the stand 220 is not limited thereto. For example, the stand 220 may be formed of a metal material (e.g., stainless).

According to an embodiment, the stand 220 may further include a first fastener 233. According to an embodiment, the first fastener 233 may be formed on the stand body 221. For example, the first fastener 233 may be formed on the inner surface 220d adjacent to the lower surface 220e of the stand body 221.

According to an embodiment, the protective cover 200 may include a second fastener (not shown), and the second fastener of the protective cover 200 may be formed at a position corresponding to the first fastener 233 of the stand 220. For example, the second fastener may be formed on a surface opposite to a third surface (211c of FIG. 3) of the recess 211 on the rear surface 110b of the protective cover 200.

According to an embodiment, the first fastener 233 may be formed in a structure engaging with the second fastener. According to an embodiment, the first fastener 233 may be detachably disposed with the second fastener. According to an embodiment, the first fastener 233 may be formed in a hook shape, and the second fastener may be formed in a groove for catching the hook shape.

However, the shape and the structure of the first fastener 233 and the second fastener are not limited thereto. For example, the first fastener 233 may be formed of a magnet, and the second fastener may be formed of a metal material to which the magnet may be attached.

Hereinafter, a specific embodiment of the hooking portion 240 of the protective cover 200 and the protrusion 250 of the stand 220 shall explained with reference to FIG. 5 through FIG. 11.

Figure 5:
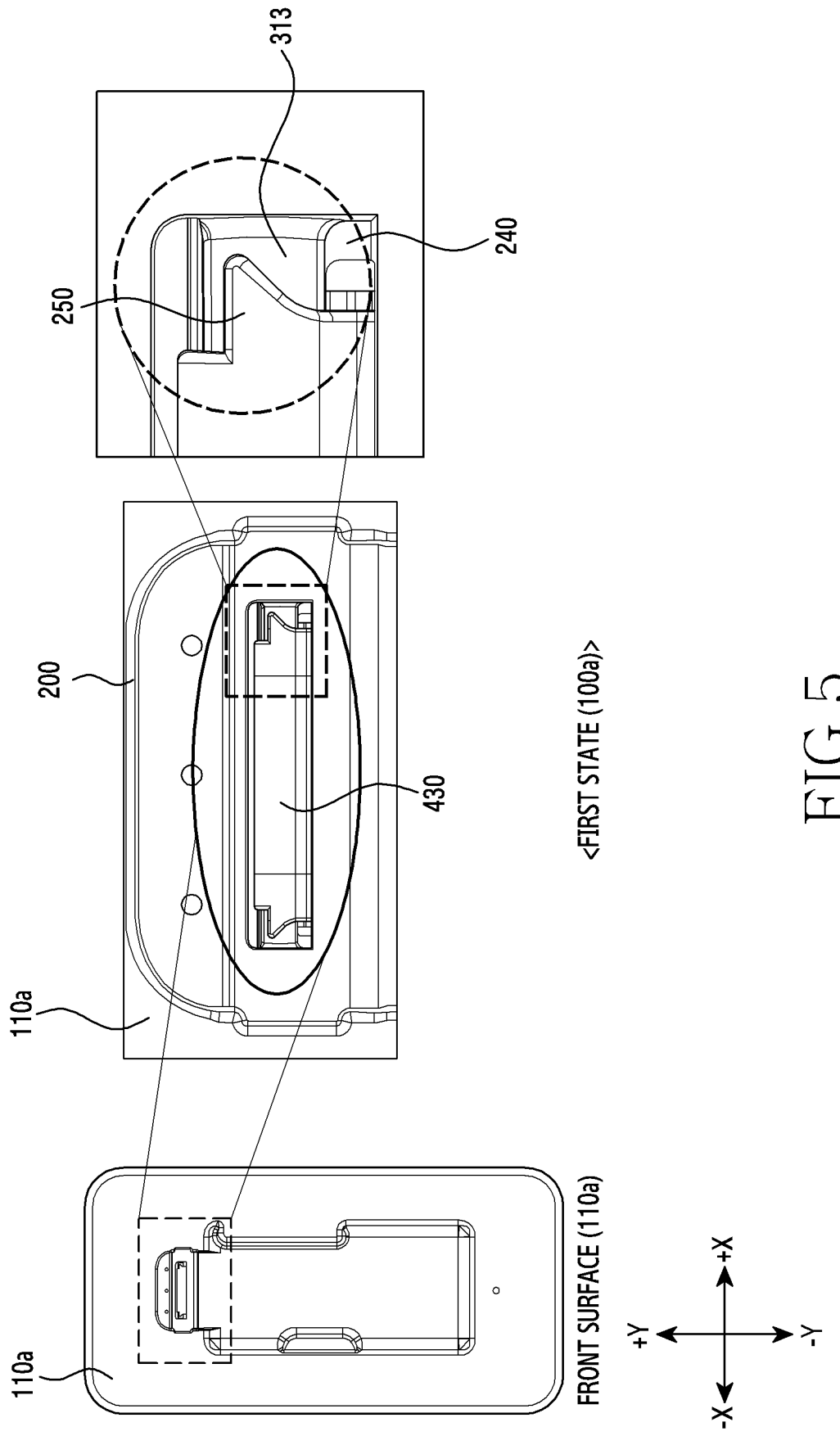
FIG. 5 is a diagram illustrating a rear view of an accessory case according to an embodiment.

FIG. 5 is a diagram illustrating a rear surface of an accessory case according to an embodiment.

In particular, FIG. 5 is the view illustrating a front surface 110A of an accessory case 100 with a stand 220 mounted on a protective cover 200 and an electronic device 101 not accommodated.

Figure 6:
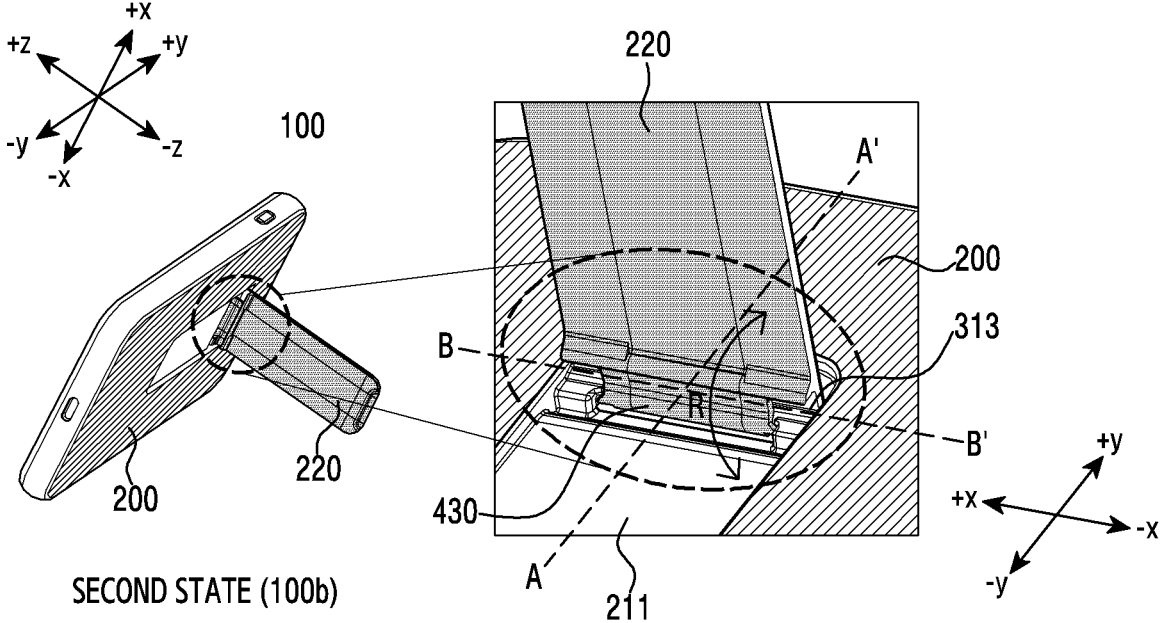
FIG. 6 is a diagram illustrating a perspective view of a rear surface of an accessory case according to an embodiment.

Referring to FIG. 5 and FIG. 6, according to an embodiment, the stand 220 may be coupled with the protective cover 200, and may be rotatably coupled with the protective cover 200.

Referring to FIG. 5, according to an embodiment, the stand 220 may be mounted in a recess (211 of FIG. 3) of the protective cover 200. According to an embodiment, the accessory case 100 may include the first state 100a mounted in the recess 211.

Referring to FIG. 5, in the first state 100a of the accessory case 100, a gripper 430 and a protrusion 250 may be disposed toward the front surface 110A (e.g., the +z direction) of the accessory case 100.

According to an embodiment, in the first state 100a, the protrusion 250 may be spaced apart from the hooking portion 240. For example, the protrusion 250 and the hooking portion 240 do not contact each other in the first state 100a, and accordingly the protrusion 250 may not be caught by the hooking portion 240. Since the protrusion 250 is not caught by the hooking portion 240 in the first state 100a, the protrusion 250 may not secure the stand 220 to the protective cover 200.

Hence, the stand 220 and the protective cover 200 in the first state 100a may be easily separated without the engagement of the protrusion 250 and the hooking portion 240.

FIG. 6 is the view illustrating that a stand 220 and a protective cover 200 are opened at a specific angle when they are coupled together.

Referring to FIG. 6, according to an embodiment, the stand 220 may be rotatably coupled with the protective cover 200. More specifically, a second coupling member (231 of FIG. 4) of the stand 220 may be coupled with a first coupling member (213 of FIG. 3) of the protective cover 200. In operation, the stand 220 may attached to the protective cover 200, by coupling the first coupling member 213 and the second coupling member 231 together. As a result, the stand 220 including the second coupling member 231 may rotate based on the first coupling member 213 as one axis.

Referring to FIG. 5 and FIG. 6, a gripper 430 may be force-fitted into a bar 313. Thus, the stand 220 may be rotated by the arrangement of the gripper 430 being force-fitted into the bar 313. As a result, the stand 220 may rotate based on the bar 313 formed in a recess 211 as one axis.

As shown, the stand 220 may support the protective cover 200 by rotating at a first angle R. According to an embodiment, the accessory case 100 may include the second state 100b in which the stand 220 rotates the first angle (e.g., the angle R) from the first state 100a. For example, in the second state 100b, the stand 220 may rotate and open with the protective cover 200 at the first angle (e.g., the angle R) to support the protective cover 200.

According to an embodiment, the accessory case 100 may include the A-A' axis and the B-B' axis. The axis A-A' may indicate the Y axis on the stand 220 and the protective cover 200. The B-B' axis may indicate the Z axis on the stand 220 and the protective cover 200.

Figure 7:
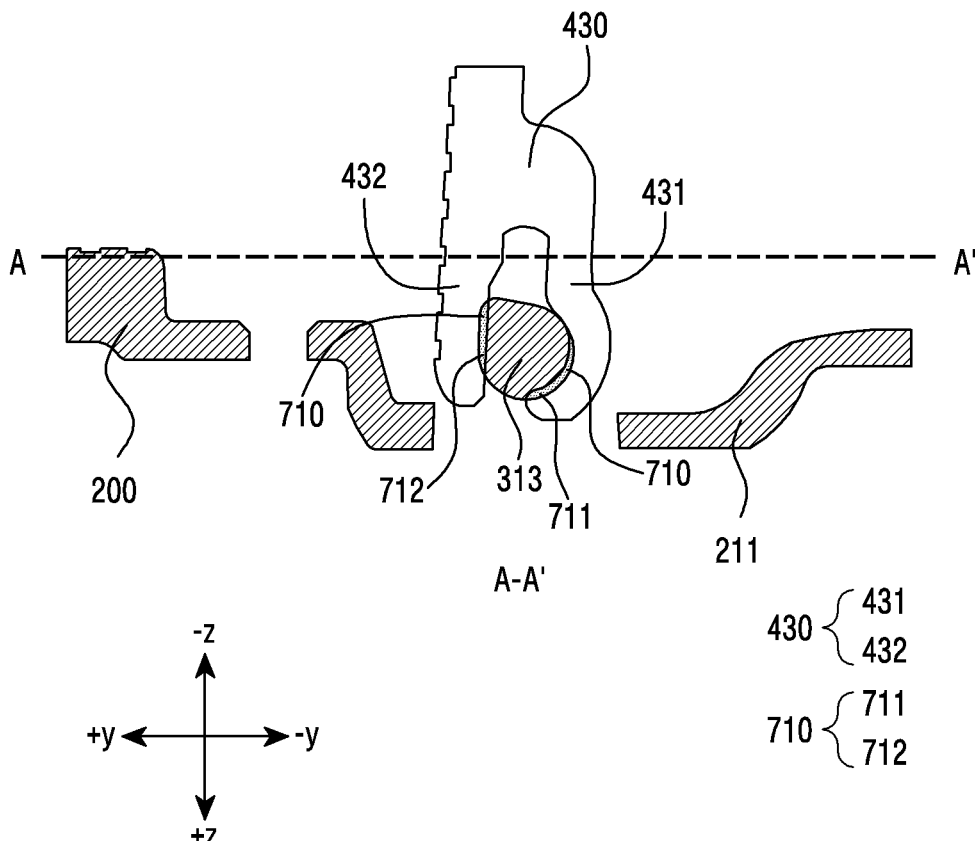
FIG. 7 is a diagram illustrating a cross-sectional view of an AA' axis of an accessory case according to an embodiment.

FIG. 7 is the view illustrating one cross section of the stand 220 and the protective cover 200 on the A-A' axis and the B-B' axis.

As shown, the gripper 430 of the stand 220 may be force-fitted into the bar 313 of the protective cover 200 along the A-A' axis. The bar 313 may include at least one groove 710 in an area contacting the gripper 430. As the gripper 430 is force-fitted into the groove 710, the gripper 430 and the bar 313 may overlap in one area.

The at least one groove 710 may include a first groove 711 and a second groove 712. The first groove 711 may be formed in an area contacting the first grip portion 431, and the second groove 712 may be formed in an area contacting the second grip portion 432.

As shown, one area of the gripper 430 and the bar 313 may be overlapped by the groove 710 which in turn secures the stand 220 to the protective cover 200.

However, the position where the groove 710 is formed is not limited thereto. For example, the groove 710 may be formed on the gripper 430.

Figure 8:
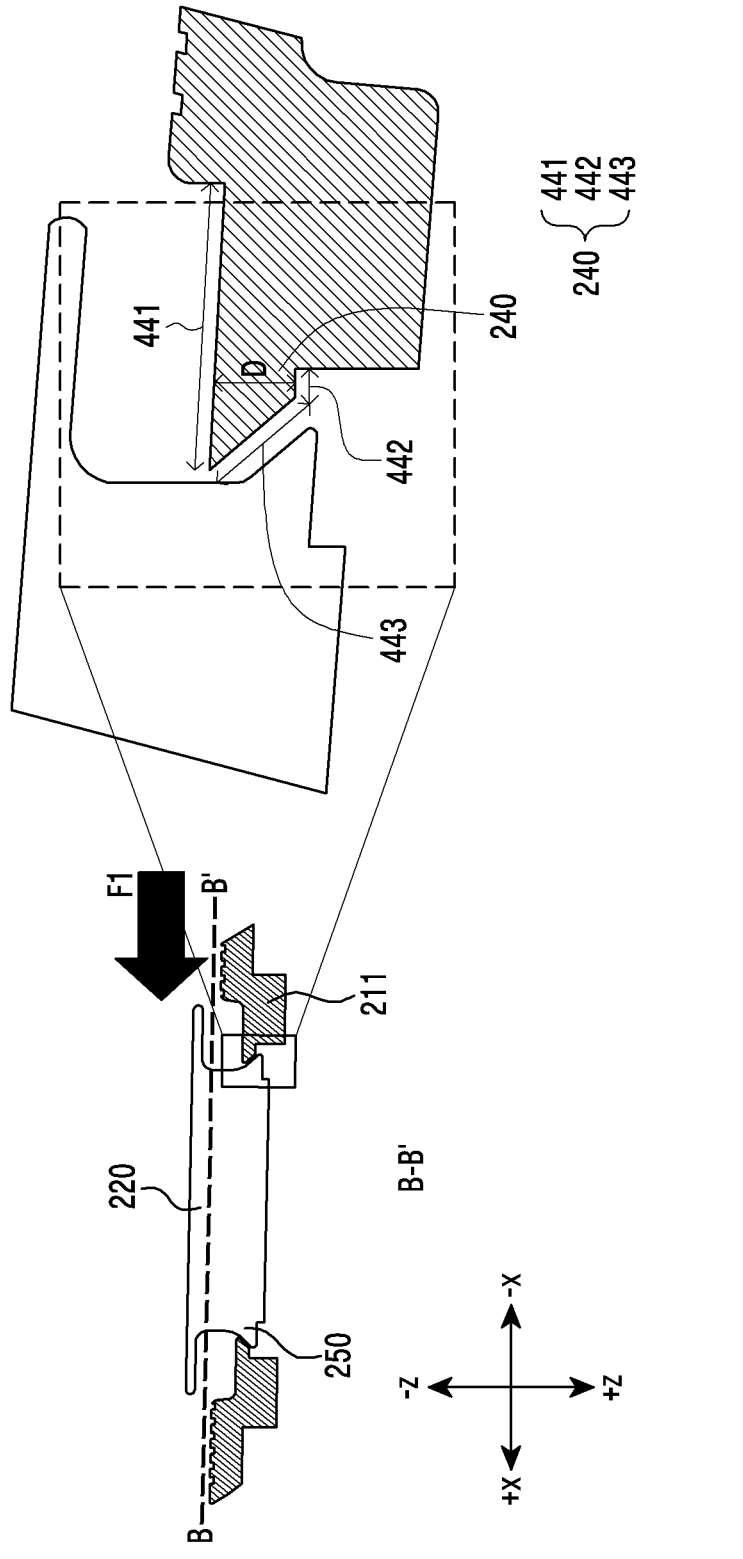
FIG. 8 is a diagram illustrating a cross-sectional view of an axis BB' of an accessory case according to an embodiment.

Referring FIG. 8, the protrusion 250 may be disposed adjacent to the hooking portion 240 in the second state 100b. For example, the protrusion 250 may contact the hooking portion 240 in the first direction (e.g., the −z direction). The protrusion 250 may be caught by the hooking portion 240 in the first direction (e.g., the −z direction). According to an embodiment, if lateral force F1 is applied in the second direction (e.g., the x direction) perpendicular to the first direction (e.g., the −z direction), the stand 220 may be protected from moving from the protective cover 200 in the first direction (e.g., the −z direction).

Referring to the BB'-axis diagram of FIG. 8, a thickness D of the hooking portion 240 may decrease as extending from one surface of the recess 211 to one end toward the first direction (e.g., the +x direction or the −x direction). For example, the thickness D of the hooking portion 240 may decrease as extending from the recess 211 to the terminal end of the hooking portion 240.

According to an embodiment, the hooking portion 240 may include an upper surface 441 and a lower surface 442. The upper surface 441 of the hooking portion 240 may be formed in a wider shape than the lower surface 442. The upper surface 441 and the lower surface 442 may be connected by a connection portion 443. The thickness D of the hooking portion 240 may be formed by gradually decreasing by the connection portion 443 connected in an oblique line or a curve line.

However, the shape of the hooking portion 240 is not limited thereto. For example, the hooking portion 240 may extend by forming a step. According to an embodiment, the hooking portion 240 may be formed by extending in an inversed-L shape. According to another example, the hooking portion 240 may be formed in a C shape.

With reference to FIG. 9 through FIG. 12, a specific embodiment of the protrusion 250 and the hooking portion 240 will be explained in detail.

Figure 9:
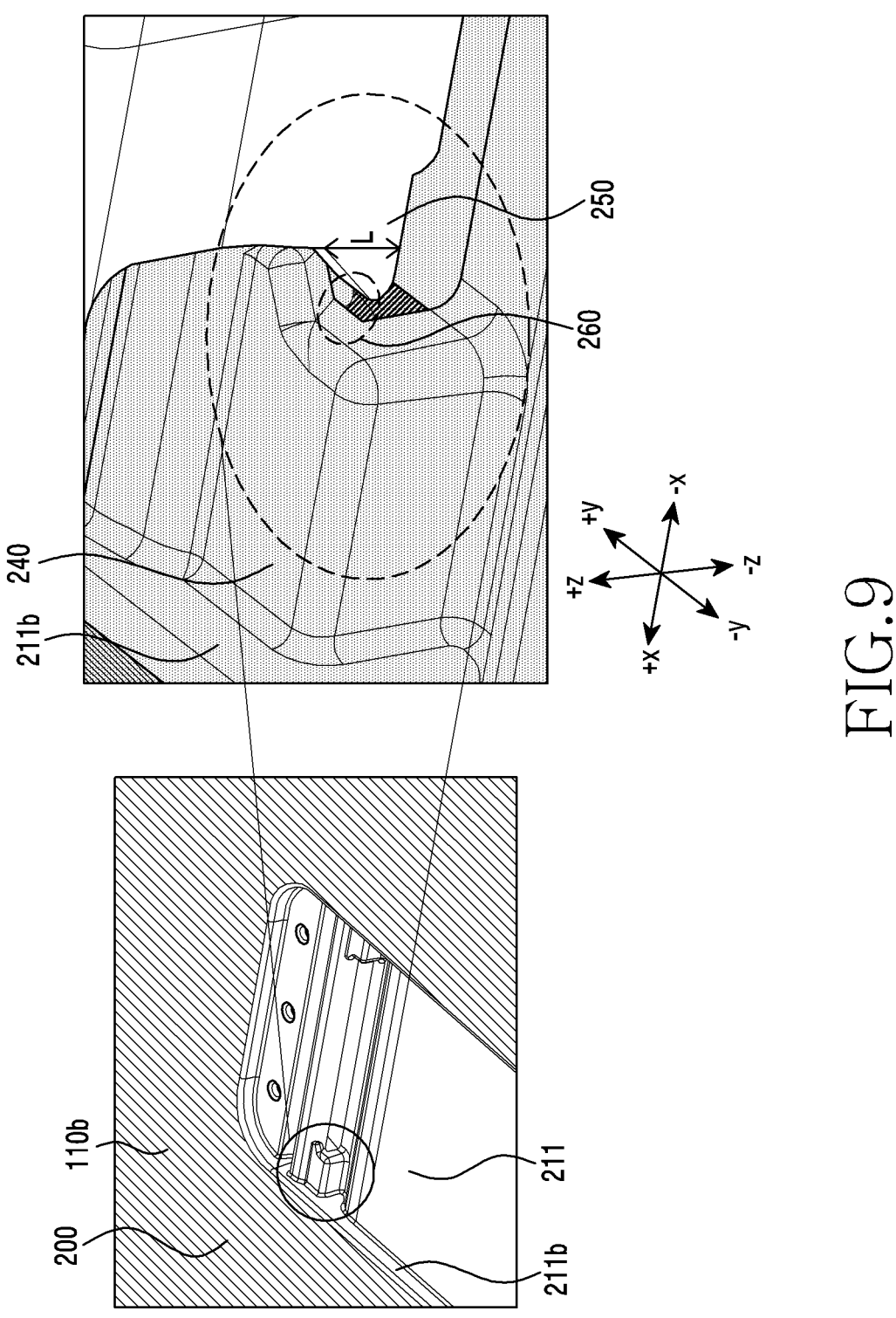
FIG. 9 is a diagram illustrating a rear surface of an accessory case according to an embodiment.

FIG. 9 is a diagram illustrating a rear surface of an accessory case according to an embodiment, and more specifically, FIG. 9 is the diagram illustrating a contact area of the protrusion 250 and the hooking portion 240.

As shown, the protrusion 250 may be formed from one end of the stand body 221. For example, the protrusion 250 may extend from one end of the stand body 221 in the first direction (e.g., the +x direction or the −x direction). According to another embodiment, a thickness L of the protrusion 250 may gradually decrease from the stand body 221 to one end of the protrusion 250 according to design choice. For example, the protrusion 250 may extend from the stand body 221 to the terminal end of the protrusion 250 in a curved line or an oblique line. According to an embodiment, a cross section on one axis of the protrusion 250 (e.g., a cross section on the XZ axis) may be formed as a triangular cross section.

It should be noted that the shape in which the protrusion 250 extends and the cross section shape of the protrusion 250 are not limited thereto. For example, the protrusion 250 may be formed in an elliptical cross section. Alternatively, the protrusion 250 may be formed in a rectangular cross section.

According to an embodiment, the hooking portion 240 may extend from one surface of the recess 211 in the first direction (e.g., the +x direction or the –x direction).

According to an embodiment, the hooking portion 240 may be formed inn one surface of the recess 211. For example, the hooking portion 240 may be formed in the second surface 211b of the recess 211. The hooking portion 240 may be formed to have a specific thickness in the second surface 211b and to extend in the first direction (e.g., the –x direction).

According to an embodiment, the hooking portion 240 may further include at least one groove 260. The protrusion 250 may be inserted into the groove 260 of the hooking portion 240 in the second state 100b. According to an embodiment, as the protrusion 250 is inserted into the groove 260, the protrusion 250 may be received or caught on the hooking portion 240.

In operation, the protrusion 250 may be caught by the hooking portion 240 to serve to secure the stand 220 to the protective cover 200. As a result, the protrusion 250 engages with the hooking portion 240 to prevent the stand 220 from separating from the protective cover 200.

Figure 10:
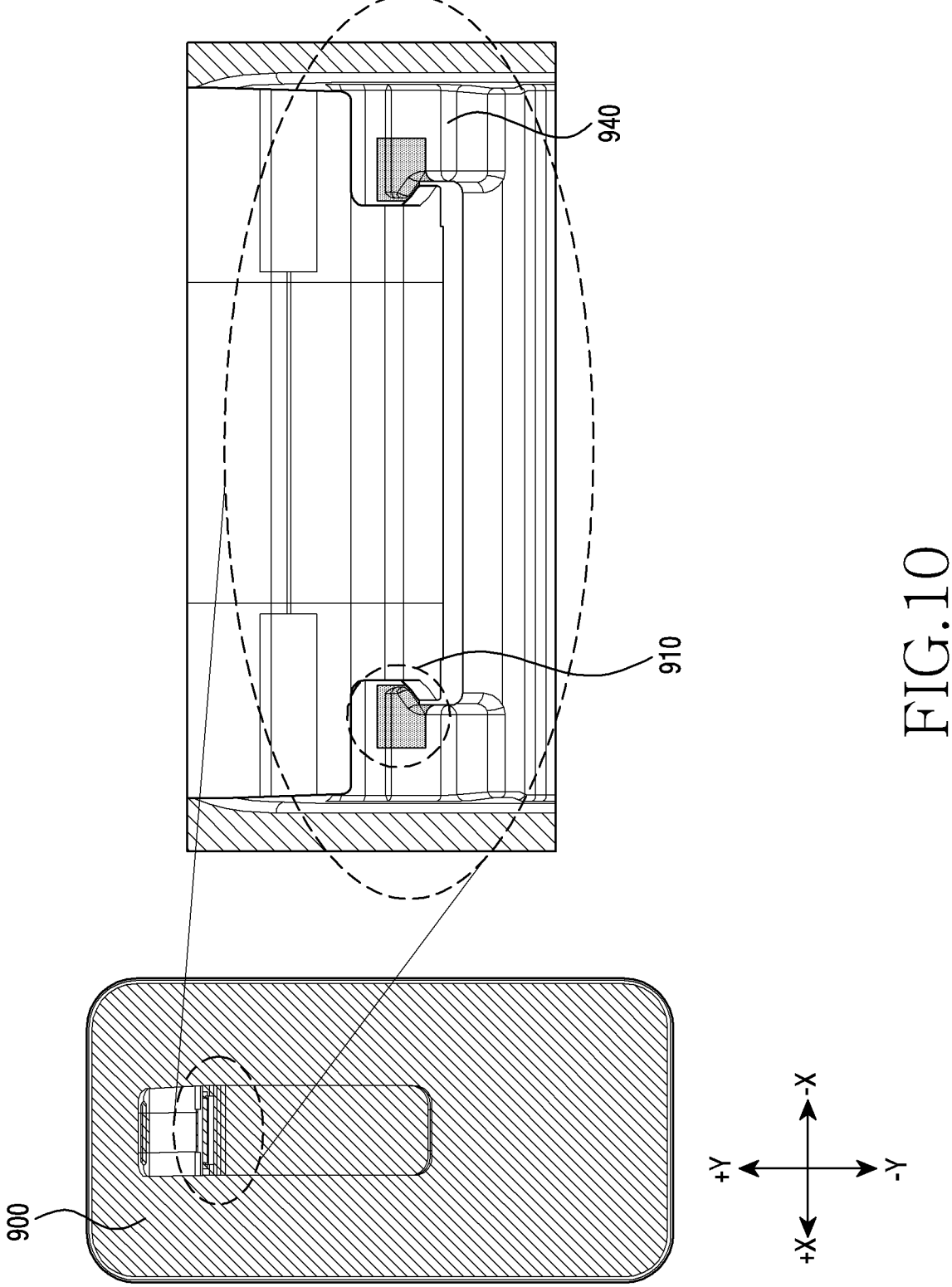
FIG. 10 is a diagram illustrating a rear surface of an accessory case according to an embodiment.

FIG. 10 is a diagram illustrating a rear surface of an accessory case according to an embodiment.

More specifically, FIG. 10 is the diagram illustrating the embodiment in which a protection pad 910 is attached onto a hooking portion 940.

As shown, the hooking portion 940 of FIG. 10 may correspond to the hooking portion 240. The protection pad 910 may be attached onto the hooking portion 940. The protection pad 910 may prevent abrasion of the surface of the hooking portion 940 due to friction between the protrusion 950 and the hooking portion 940. Since the protection pad 910 prevents the surface abrasion of the hooking portion 940, durability of the protective cover 900 may be improved. Hence, the quality of the accessory case 100 may be preserved.

According to an embodiment, the protection pad 910 may be formed with rubber. However, the material and the attachment position of the protection pad 910 are not limited thereto. For example, the protection pad 910 may be formed of Styrofoam. Also, according to another embodiment, the protection pad 910 may be attached to the surface of the protrusion 950.

Figure 11:
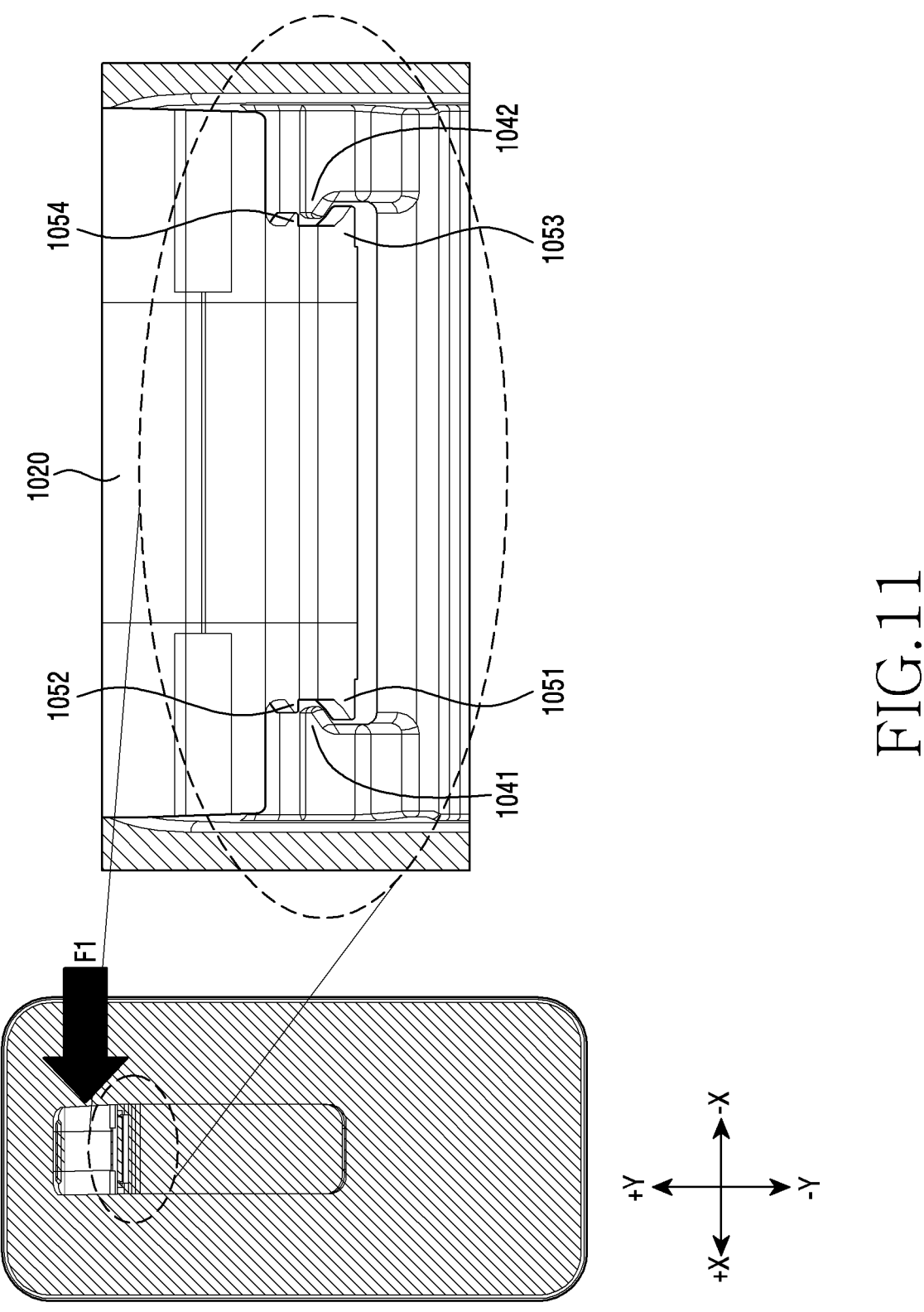
FIG. 11 is a diagram illustrating a rear surface of an accessory case according to an embodiment.

FIG. 11 is a diagram illustrating a rear surface of an accessory case, according to an embodiment.

As shown, a protrusion 1050 extending from one end of a stand body 221 may be formed of a plurality of protrusions. According to an embodiment, the protrusion 1050 may include a first protrusion 1051, a second protrusion 1052, a third protrusion 1053, and a fourth protrusion 1054.

According to an embodiment, the first protrusion 1051, the second protrusion 1052, the third protrusion 1053, and the fourth protrusion 1054 may be formed symmetrically based on one axis (e.g., the y axis) of the main body of the stand 220.

According to an embodiment, the first protrusion 1051 and the second protrusion 1052 may be caught on the first hooking portion 1041, and the third protrusion 1050 and the fourth protrusion 1050 may be caught on the second hooking portion 1042.

According to an embodiment, if lateral force F1 is applied in the first direction (e.g., the +x direction), the stand 1020 with the multiple number of the protrusions 1050, the engagement of protrusions with respect to hooking portions would prevent the separation of the stand 1020 from the protective cover 200.

Figure 12:
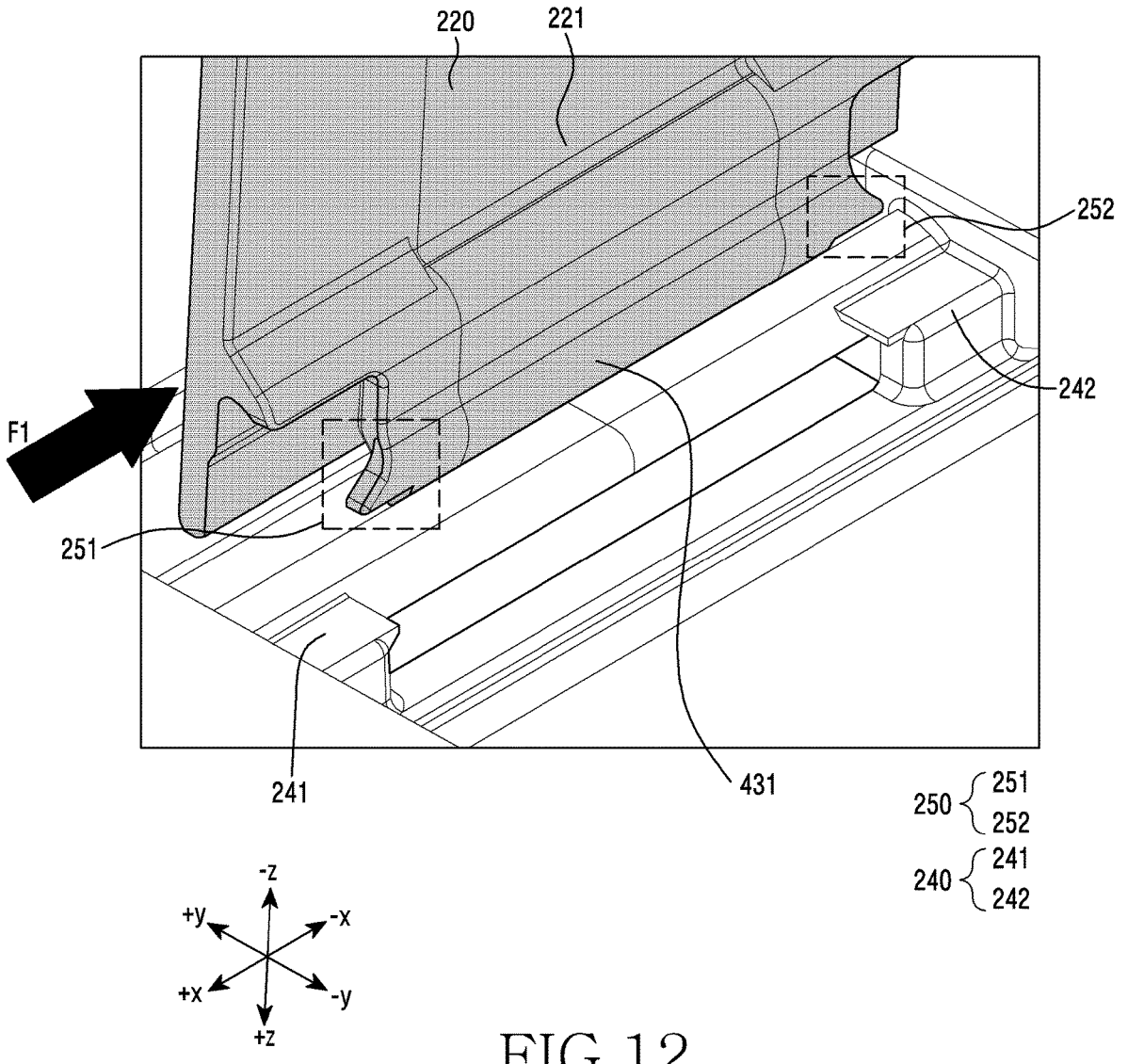
FIG. 12 is a diagram illustrating a rear surface of an accessory case according to an embodiment.

FIG. 12 is a diagram illustrating a rear surface of an accessory case according to an embodiment.

As shown, a protrusion 250 may be formed by extending from one end of a stand body 221. The protrusion 250 may include a first protrusion 251 and a second protrusion 252. For example, the first protrusion 251 may be formed by extending in the first direction (e.g., the +x direction) on a side surface of a first grip portion 431 of the stand 220.

According to an embodiment, the protrusion 250 and the hooking portion 240 may be formed symmetrically based on one axis (e.g., the y axis) of the accessory case 100.

According to an embodiment, if the stand 220 coupled with the protective cover 200 receives the lateral force F1 in one direction (e.g., the –x direction), the protrusion 250 may be engaged with the hooking portion 240 would counter the lateral force. Accordingly, since the protrusion 250 is caught by the hooking portion 240, the stand 220 may be prevented from separating from the protective cover 200.

Figure 13:
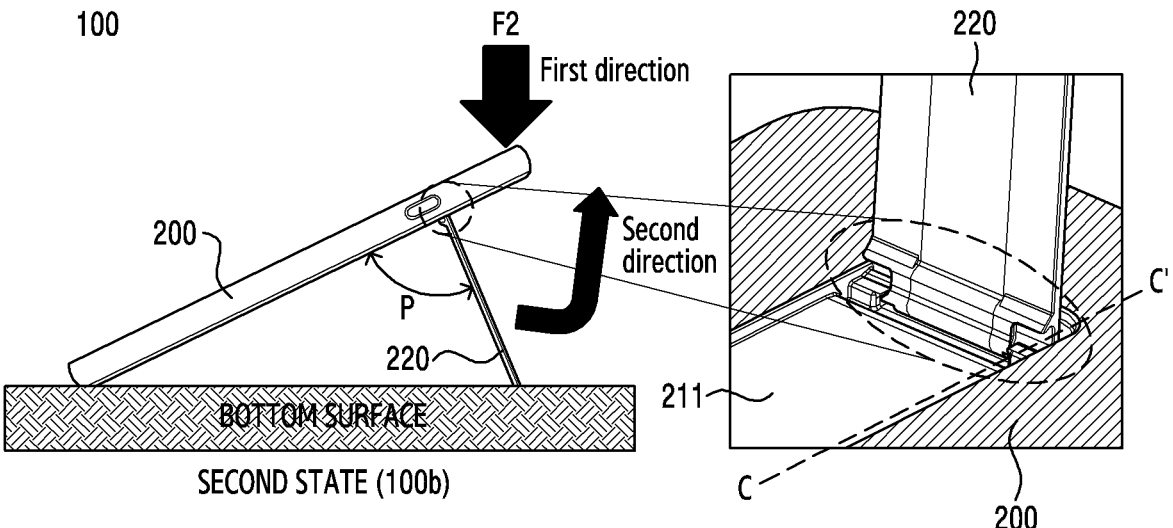
FIG. 13 is a diagram illustrating side and rear surfaces of an accessory case according to an embodiment.

FIG. 13 is a diagram illustrating side and rear surfaces of an accessory case according to an embodiment. More specifically, FIG. 13 is the diagram illustrating the second state 100b of the accessory case 100 and states of the stand 220 and the protective cover 200.

Figure 14:
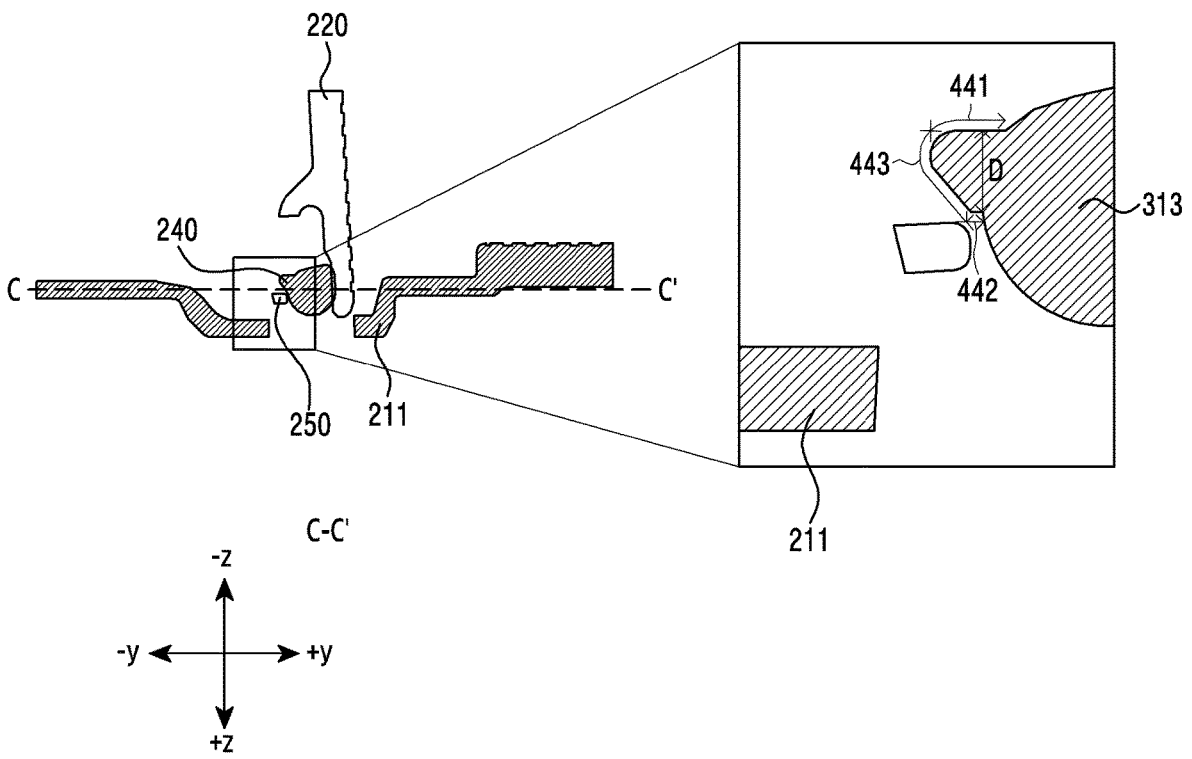
FIG. 14 is a diagram illustrating a cross-sectional view of a CC' axis of an accessory case according to an embodiment.

FIG. 14 is a diagram illustrating a cross section of a CC' axis of an accessory case, according to an embodiment.

Referring to FIG. 13, if the accessory case 100 receives a vertical force F2 in the first direction (e.g., the –z direction), the stand 220 may rotate in the second direction. According to an embodiment, the stand 220 may have an allowable radius of rotation (e.g., an angle P). According to an embodiment, if exceeding the rotation radius P, the stand 220 may be separated from the protective cover 200. According to another embodiment, the stand 220 may be damaged along with the separation from the protective cover 200.

According to an embodiment, FIG. 14 is the diagram illustrating the cross section of the CC' axis (e.g., the cross section of the yz plane) if the accessory case 100 receives vertical force (F2 of FIG. 13) in the first direction (e.g., the –z direction).

According to an embodiment, the hooking portion 240, the protrusion 250, and the bar 313 may be disposed adjacent to each other on the CC' axis. According to an embodiment, the protrusion 250 may be caught on the hooking portion 240 in the first direction (e.g., the –z direction).

According to an embodiment, the hooking portion 240 may be formed by extending from one surface of the recess 211.

Referring to the drawings of the BB' axis of FIG. 7 and the CC' axis of FIG. 14, according to an embodiment, the hooking portion 240 may decrease in thickness as extending from one surface of the recess 211 toward the first direction (e.g., the +x direction or the –x direction) as described in FIG. 7.

According to an embodiment, the space between the upper surface 441 of the hooking portion 240 and the lower surface 442 of the hooking portion 240 may be connected by the connection portion 443 of the hooking portion 240. According to an embodiment, the thickness D of the hooking portion 240 may be formed by gradually decreasing by the connection portion 443 connected in the oblique line or the curved line.

According to an embodiment, through the gradual decrease in the thickness of the hooking portion 240, even if the vertical force F2 is received from the outside, the protrusion 250 may be naturally separated along the connection portion 443 of the hooking portion 240.

Thus, the stand 220 may be naturally separated from the protective cover 200. According to an embodiment, the stand 220 may be naturally separated from the protective cover 200 to thus prevent the stand 220 from the damage.

Figure 15:
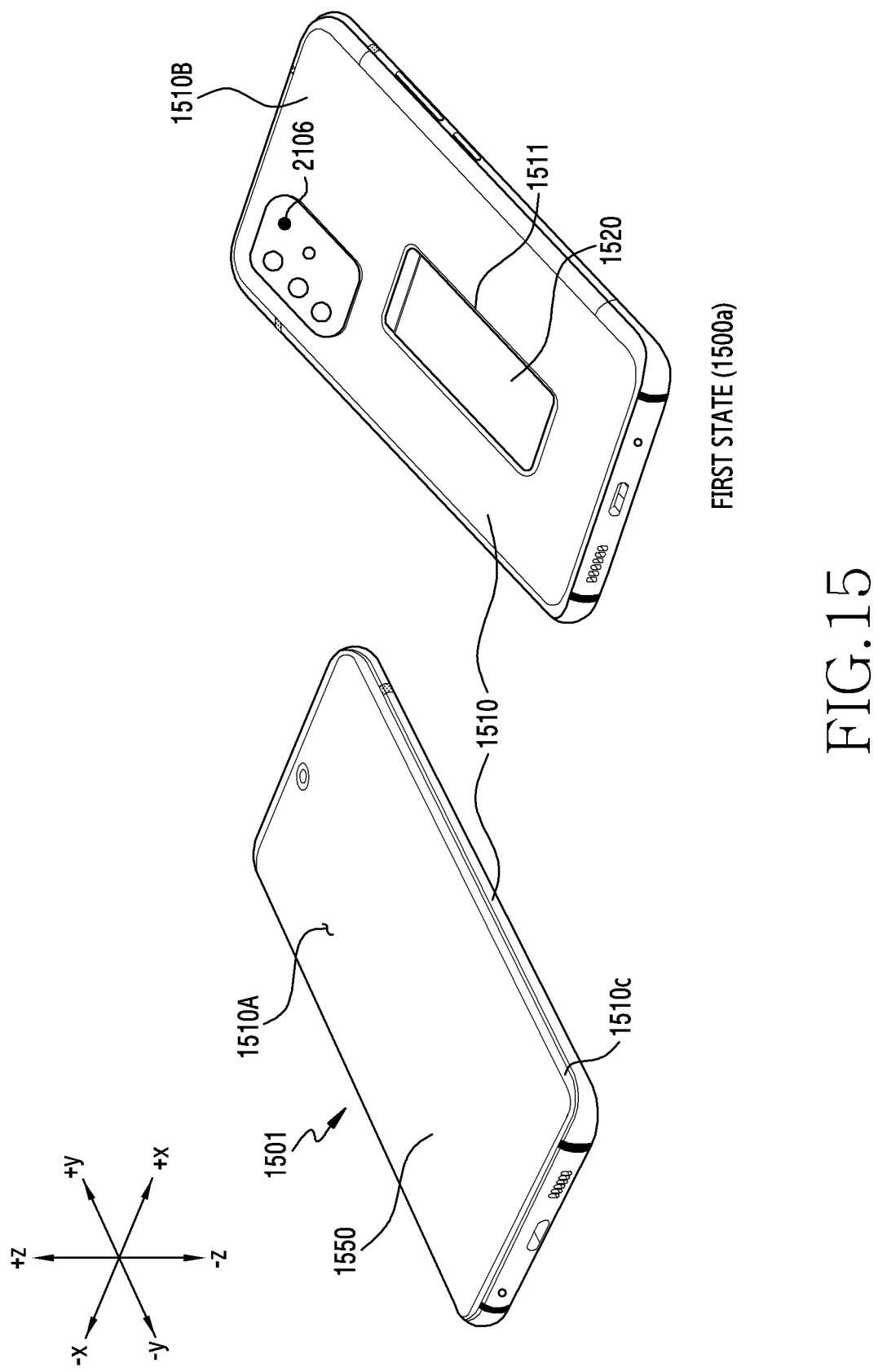
FIG. 15 is a diagram illustrating a perspective view of front and rear surfaces of an electronic device according to an embodiment.

FIG. 15 is a diagram illustrating a perspective view of front and rear surfaces of an electronic device, according to an embodiment.

Referring to FIG. 15, an electronic device 1501 according to an embodiment of the present invention discloses an example of a bar type electronic device. However, it should be noted that the teachings of present invention may be applied to, but is not limited thereto, slidable, rollable, and foldable electronic devices.

Referring to FIG. 15, the electronic device 1501 according to an embodiment may a housing 1501 including a first surface (or a front surface) 1510A, a second surface (or a rear surface) 1510B, and a side surface (or a sidewall) 1510C surrounding a space between the first surface 1510A and the second surface 1510B. In another embodiment, the housing 1510 may indicate a structure which forms a part of the first surface 1510A, the second surface 1510B, and the side surface 1510C.

According to an embodiment, the first surface 1510A may include a display 1550. The first surface 1510*a* may be formed in at least a part by a front plate (e.g., a polymer plate) which is substantially transparent. The front plate may be formed by surrounding edges of the first surface 1510*a*.

According to an embodiment, the rear surface 1510B of the housing 1510 may include a recess 1511. A stand 1520 may be mounted in the recess 1511 of the rear surface 1510B of the electronic device.

According to an embodiment, the rear surface 1510B of the housing 1510 of FIG. 15 may refer to the rear surface 110B of the protective cover 200 described above. The stand 1520 of FIG. 15 may refer to the stand 220 aforementioned.

The housing 1510 of FIG. 15 may include or omit the configuration of the protective cover 200 described above. According to an embodiment, the housing 1510 may include a hooking portion (240 of FIG. 3), and the stand 1520 of FIG. 15 may include a protrusion (250 of FIG. 3) of the stand 220 mentioned above.

According to an embodiment, the stand 1520 may be rotatably coupled with the rear surface 1510B of the housing 1510.

According to an embodiment, the electronic device 1501 may include a first state 1500*a* and a second state (not shown). The first state 1500*a* may indicate that the stand 1520 is mounted in the recess 1511. The second state may indicate that the stand 1520 supports the housing 1510 at a specific angle from the housing 1510.

According to an embodiment, the protrusion 250 of the stand 1520 may be caught by the hooking portion 240 of the housing 1510 in the second state, and as a result, the stand 1520 may be restrained to the housing 1510.

According to an embodiment, the hooking portion 240 may be formed symmetrically based on one axis of the recess 1511 within the recess 1511, and the hooking portion 240 may be extended in an inversed-L shape.

According to an embodiment, the hooking portion 240 may include at least one groove and enter the second state, and the protrusion 250 may be inserted into the groove, to thus restrain the stand 1520.

According to an embodiment, a rubber pad may be attached to the outer surface of the hooking portion 240 to prevent the abrasion of the clasp 240 from external impact.

Figure 16:
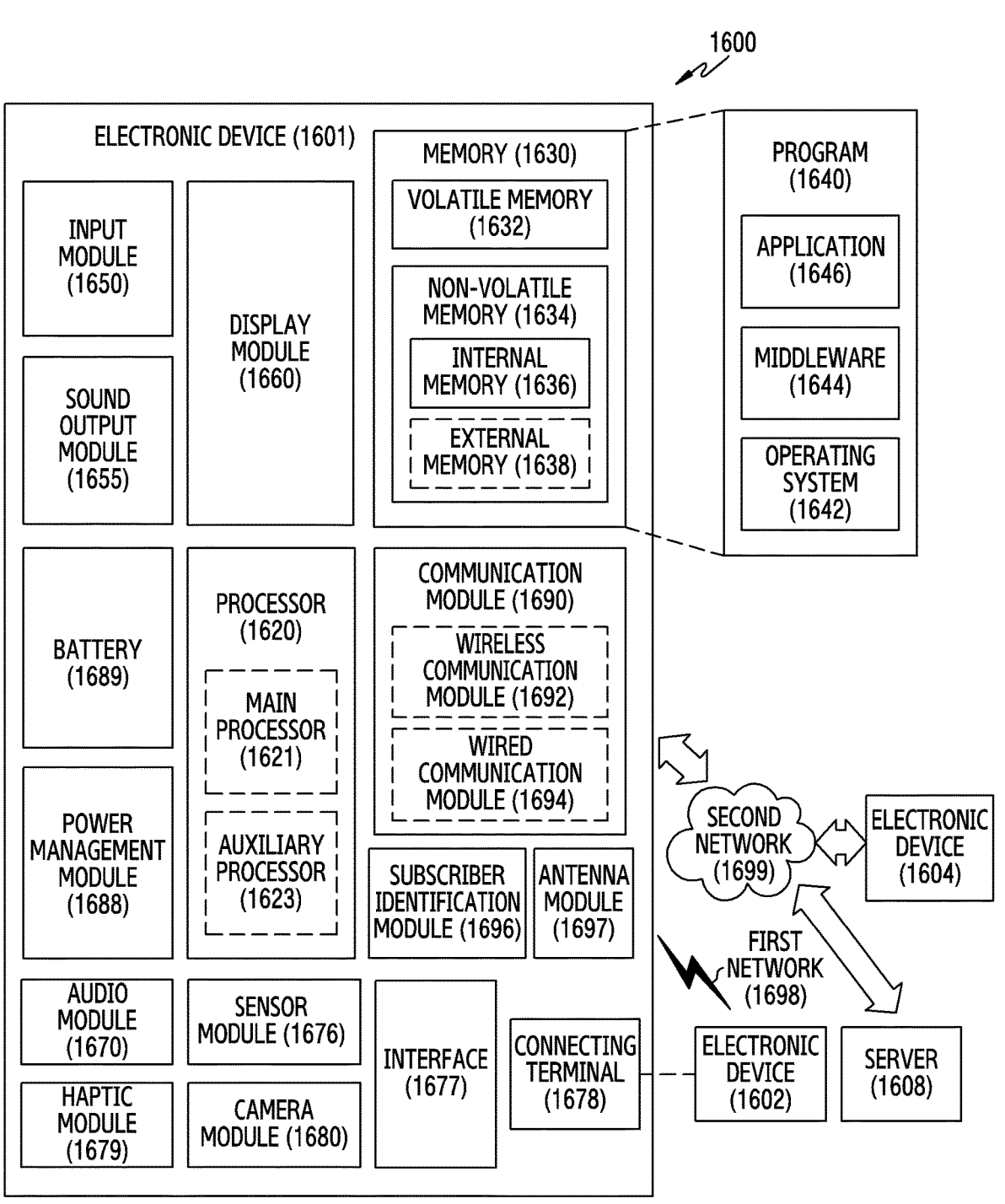
FIG. 16 is a diagram illustrating an electronic device in a network environment according to an embodiment.

FIG. 16 is a diagram illustrating an electronic device in a network environment according to an embodiment.

An electronic device 1601 of FIG. 16 to be described may refer to the electronic device 101 of FIG. 1 or the electronic device 1501 of FIG. 15 described earlier.

FIG. 16 is a block diagram illustrating an electronic device 1601 in a network environment 1600 according to certain embodiments. Referring to FIG. 16, the electronic device 1601 in the network environment 1600 may communicate with an electronic device 1602 via a first network 1698 (e.g., a short-range wireless communication network), or at least one of an electronic device 1604 or a server 1608 via a second network 1699 (e.g., a long-range wireless communication network). According to an embodiment, the electronic device 1601 may communicate with the electronic device 1604 via the server 1608. According to an embodiment, the electronic device 1601 may include a processor 1620, memory 1630, an input module 1650, a sound output module 1655, a display module 1660, an audio module 1670, a sensor module 1676, an interface 1677, a connecting terminal 1678, a haptic module 1679, a camera module 1680, a power management module 1688, a battery 1689, a communication module 1690, a subscriber identification module (SIM) 1696, or an antenna module 1697. In some embodiments, at least one of the components (e.g., the connecting terminal 1678) may be omitted from the electronic device 1601, or one or more other components may be added in the electronic device 1601. In some embodiments, some of the components (e.g., the sensor module 1676, the camera module 1680, or the antenna module 1697) may be implemented as a single component (e.g., the display module 1660).

The processor 1620 may execute, for example, software (e.g., a program 1640) to control at least one other component (e.g., a hardware or software component) of the electronic device 1601 coupled with the processor 1620, and may perform various data processing or computation. According to one embodiment, as at least part of the data processing or computation, the processor 1620 may store a command or data received from another component (e.g., the sensor module 1676 or the communication module 1690) in volatile memory 1632, process the command or the data stored in the volatile memory 1632, and store resulting data in non-volatile memory 1634. According to an embodiment, the processor 1620 may include a main processor 1621 (e.g., a central processing unit (CPU) or an application processor (AP)), or an auxiliary processor 1623 (e.g., a graphics processing unit (GPU), a neural processing unit (NPU), an image signal processor (ISP), a sensor hub processor, or a communication processor (CP)) that is operable independently from, or in conjunction with, the main processor 1621. For example, when the electronic device 1601 includes the main processor 1621 and the auxiliary processor 1623, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control at least some of functions or states related to at least one component (e.g., the display module 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). According to an embodiment, the auxiliary processor 1623 (e.g., an image signal processor or a communication processor) may be implemented as part of another component (e.g., the camera module 1680 or the communication module 1690) functionally related to the auxiliary processor 1623. According to an embodiment, the auxiliary processor 1623 (e.g., the neural processing unit) may include a hardware structure specified for artificial intelligence model processing. An artificial intelligence model may be generated by machine learning. Such learning may be performed, e.g., by the electronic device 1601 where the artificial intelligence is performed or via a separate server (e.g., the server 1608). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1630 may store various data used by at least one component (e.g., the processor 1620 or the sensor module 1676) of the electronic device 1601. The various data may include, for example, software (e.g., the program 1640) and input data or output data for a command related thereto. The memory 1630 may include the volatile memory 1632 or the non-volatile memory 1634.

The program 1640 may be stored in the memory 1630 as software, and may include, for example, an operating system (OS) 1642, middleware 1644, or an application 1646.

The input module 1650 may receive a command or data to be used by another component (e.g., the processor 1620) of the electronic device 1601, from the outside (e.g., a user) of the electronic device 1601. The input module 1650 may include, for example, a microphone, a mouse, a keyboard, a key (e.g., a button), or a digital pen (e.g., a stylus pen).

The sound output module 1655 may output sound signals to the outside of the electronic device 1601. The sound output module 1655 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1660 may visually provide information to the outside (e.g., a user) of the electronic device 1601. The display module 1660 may include, for example, a display, a hologram device, or a projector and control circuitry to control a corresponding one of the display, hologram device, and projector. According to an embodiment, the display module 1660 may include a touch sensor adapted to detect a touch, or a pressure sensor adapted to measure the intensity of force incurred by the touch.

The audio module 1670 may convert a sound into an electrical signal and vice versa. According to an embodiment, the audio module 1670 may obtain the sound via the input module 1650, or output the sound via the sound output module 1655 or a headphone of an external electronic device (e.g., an electronic device 1602) directly (e.g., wiredly) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. According to an embodiment, the sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device (e.g., the electronic device 1602) directly (e.g., wiredly) or wirelessly. According to an embodiment, the interface 1677 may include, for example, a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device (e.g., the electronic device 1602). According to an embodiment, the connecting terminal 1678 may include, for example, a HDMI connector, a USB connector, a SD card connector, or an audio connector (e.g., a headphone connector).

The haptic module 1679 may convert an electrical signal into a mechanical stimulus (e.g., a vibration or a movement) or electrical stimulus which may be recognized by a user via his tactile sensation or kinesthetic sensation. According to an embodiment, the haptic module 1679 may include, for example, a motor, a piezoelectric element, or an electric stimulator.

The camera module 1680 may capture a still image or moving images. According to an embodiment, the camera module 1680 may include one or more lenses, image sensors, image signal processors, or flashes.

The power management module 1688 may manage power supplied to the electronic device 1601. According to one embodiment, the power management module 1688 may be implemented as at least part of, for example, a power management integrated circuit (PMIC).

The battery 1689 may supply power to at least one component of the electronic device 1601. According to an embodiment, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 (e.g., the application processor (AP)) and supports a direct (e.g., wired) communication or a wireless communication. According to an embodiment, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth™, wireless-fidelity (Wi-Fi) direct, or infrared data association (IrDA)) or the second network 1699 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1692 may identify and authenticate the electronic device 1601 in a communication network, such as the first network 1698 or the second network 1699, using subscriber information (e.g., international mobile subscriber identity (IMSI)) stored in the subscriber identification module 1696.

The wireless communication module 1692 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1692 may support a high-frequency band (e.g., the mmWave band) to achieve, e.g., a high data transmission rate. The wireless communication module 1692 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1692 may support various requirements specified in the electronic device 1601, an external electronic device (e.g., the electronic device 1604), or a network system (e.g., the second network 1699). According to an embodiment, the wireless communication module 1692 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of Ims or less) for implementing URLLC.

The antenna module 1697 may transmit or receive a signal or power to or from the outside (e.g., the external electronic device) of the electronic device 1601. According to an embodiment, the antenna module 1697 may include an antenna including a radiating element composed of a conductive material or a conductive pattern formed in or on a substrate (e.g., a printed circuit board (PCB)). According to an embodiment, the antenna module 1697 may include a plurality of antennas (e.g., array antennas). In such a case, at least one antenna appropriate for a communication scheme used in the communication network, such as the first network 1698 or the second network 1699, may be selected, for example, by the communication module 1690 (e.g., the wireless communication module 1692) from the plurality of antennas. The signal or the power may then be transmitted or received between the communication module 1690 and the external electronic device via the selected at least one antenna. According to an embodiment, another component (e.g., a radio frequency integrated circuit (RFIC)) other than the radiating element may be additionally formed as part of the antenna module 1697. According to certain embodiments, the antenna module 1697 may form a mm Wave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1601 and the external electronic device 1604 via the server 1608 coupled with the second network 1699. Each of the electronic devices 1602 or 1604 may be a device of a same type as, or a different type, from the electronic device 1601. According to an embodiment, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, mobile edge computing (MEC), or client-server computing technology may be used, for example. The electronic device 1601 may provide ultra low-latency services using, e.g., distributed computing or mobile edge computing. In another embodiment, the external electronic device 1604 may include an internet-of-things (IoT) device. The server 1608 may be an intelligent server using machine learning and/or a neural network. According to an embodiment, the external electronic device 1604 or the server 1608 may be included in the second network 1699. The electronic device 1601 may be applied to intelligent services (e.g., smart home, smart city, smart car, or healthcare) based on 5G communication technology or IoT-related technology.

According to certain embodiments, an accessory case for protecting an exterior of an electronic device may include a protective cover for accommodating the electronic device in a front surface, and comprising a recess in a rear surface; and a stand rotatably coupled with the protective cover, the stand may include a stand body; and a protrusion protruding from at least one end of the stand body, and the protective cover may include a hooking portion which is restrained to the protective cover, as the stand rotates from a first state mounted in the recess to a second state and the protrusion is caught.

According to an embodiment, the protective cover may include a first coupling member formed in the rear surface of the protective cover, the stand may include a second coupling member extending from the stand body and coupled with the first coupling member to operate, and the stand may be rotated by the second coupling member coupled to the first coupling member.

According to an embodiment, the first coupling member may include a bar, the second coupling member may include a rotatable gripper force-fitted into the bar, and the stand may be rotated by the gripper coupled to the bar based on the bar as one axis.

According to an embodiment, the bar may include a groove formed in an area contacting the gripper, and the stand may be secured to the protective cover by force-fitting and overlapping the gripper into the groove.

According to an embodiment, the hooking portion may be formed symmetrically based on one axis of the recess by extending from one surface of the recess, and the hooking portion may extend in an inversed-L shape.

According to an embodiment, the hooking portion may be formed symmetrically based on one axis of the recess by extending from one surface of the recess, and the hooking portion may extend in a C-shape.

According to an embodiment, a protection pad may be attached onto an outer surface of the hooking portion to prevent abrasion of the hooking portion from external impact.

According to an embodiment, the stand may further include at least one first fastener configured to couple with the protective cover, the stand body may include an outer surface exposed to outside in the first state and an inner surface opposite to the outer surface and facing into the recess, the first fastener may be formed on the inner surface of the stand body opposite to an area coupled with the protective cover, and the protective cover may be provided on the rear surface of the protective cover to engage with the first fastener, and include a second fastener detachably disposed with the first fastener.

According to an embodiment, the hooking portion may extend from one surface of the recess, and a thickness of the hooking portion may gradually decrease in an oblique line as extending from one surface of the recess to a terminal end of the hooking portion.

According to an embodiment, the thickness of the protrusion may gradually decreases as extending from at least one end of the stand body to a terminal end of the protrusion.

According to an embodiment, the protrusion may include a first protrusion, a second protrusion, a third protrusion and a fourth protrusion, and the first protrusion, the second protrusion, the third protrusion and the fourth protrusion may be formed symmetrically based on one axis of the stand body.

According to an embodiment, the hooking portion may include at least one groove, and a movement of the stand with respect to the protective cover may be fixed as the stand enters the second state and the protrusion is inserted into and caught in the groove.

According to an embodiment, the protective cover may be formed of a plastic material.

According to an embodiment, the stand may be formed of a metal material.

According to an embodiment, the stand may be formed of a plastic material.

According to certain embodiments, an electronic device may include a housing having a display disposed on a front surface, and comprising a recess on a rear surface; and a stand rotatably coupled with the housing, the stand may include a stand body; and a protrusion protruding from at least one end of the stand body, and the housing many include a hooking portion which is restrained to the housing, as the stand rotates from a first state mounted in the recess to a second state and the protrusion is caught.

According to an embodiment, the housing may further include a bar which crosses a center of the recess, the stand may include a tongs-shaped gripper extending from the stand body and force-fitted into the bar of the housing, and the stand may be rotated by the gripper force-fitted into the bar.

According to an embodiment, the hooking portion may be formed symmetrically based on one axis of the recess in the recess, and the hooking portion may extend in an inversed-L shape.

According to an embodiment, the hooking portion may be formed symmetrically based on one axis of the recess in the recess, the hooking portion may include at least one groove, the protrusion may be inserted to the groove in the second state, and thus the stand may be restrained.

According to an embodiment, a protection pad may be attached onto an outer surface of the hooking portion to prevent abrasion of the hooking portion from external impact.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 1640) including one or more instructions that are stored in a storage medium (e.g., internal memory 1636 or external memory 1638) that is readable by a machine (e.g., the electronic device 1601). For example, a processor (e.g., the processor 1620) of the machine (e.g., the electronic device 1601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An accessory case for protecting an exterior of an electronic device, comprising:
  a protective cover, including a front side and a rear side, for accommodating the electronic device in the front side, and further including a recess in the rear side; and
  a stand rotatably coupled to the protective cover about an axis of rotation,
  wherein the stand includes,
  a stand body; and
  at least one protrusion protruding from at least one end of the stand body in a direction substantially parallel to the axis of rotation, and
  wherein the protective cover comprises at least one hooking portion which is restrained to the protective cover, as the stand rotates from a first state to a second state, wherein the stand is mounted in the recess, such that the at least one hooking portion and the at least
    one protrusion are non-overlapping in the first state,
    wherein the stand is at least partially spaced apart from the recess in the second state, such that the at least one protrusion is configured to overlap the at least one hooking portion, and
    wherein the stand is restrained to the accessory case as the at least one protrusion is engaged with the at least one hooking portion.

2. The accessory case of claim 1, wherein the protective cover comprises a first coupling member formed in the rear side of the protective cover,
    the stand comprises a second coupling member extending from the stand body and rotatably coupled to the first coupling member of the protective cover.

3. The accessory case of claim 2, wherein the first coupling member comprises a bar, and
    the second coupling member comprises a rotatable gripper that can selectively force-fitted into the bar, thereby allowing the stand to rotate with respect to the protective cover.

4. The accessory case of claim 3, wherein the bar comprises a groove formed in an area contacting the rotatable gripper, and
    wherein the stand is detachably secured to the protective cover by overlapping the gripper into the groove.

5. The accessory case of claim 1, wherein the at least one hooking portion extends from the recess and formed symmetrically along one axis of the recess, wherein
    wherein the at least one hooking portion extends in an inversed-L shape.

6. The accessory case of claim 1, wherein the at least one hooking portion extends from the recess and formed symmetrically along one axis of the recess, and
    wherein the at least one hooking portion extends in a C-shape.

7. The accessory case of claim 1, wherein a protection pad is attached onto an outer side of the at least one hooking portion to prevent abrasion of the at least one hooking portion from an external impact.

8. The accessory case of claim 1, further comprising a stand cover for protecting a couple portion between one end of the stand and the protective cover.

9. The accessory case of claim 1, further comprising a stand cover detachable coupled to the rear side of the protective cover.

10. The accessory case of claim 1, wherein the stand further comprises at least one first fastener configured to couple to the protective cover, and
    wherein the protective cover further comprises a second fastener on a rear side thereof and detachably engages with the at least one first fastener.

11. The accessory case of claim 1, wherein the at least one hooking portion extends from one side of the recess, and
    a thickness of the at least one hooking portion gradually tapers in an oblique line as extending from one side of the recess to a terminal end of the at least one hooking portion.

12. The accessory case of claim 1, wherein a thickness of the at least one protrusion gradually tapers as extending from at least one end of the stand body to a terminal end of the at least one protrusion.

13. The accessory case of claim 1, wherein the at least one protrusion comprises a first protrusion, a second protrusion, a third protrusion and a fourth protrusion, and the first protrusion, the second protrusion, the third protrusion and the fourth protrusion are formed symmetrically along one axis of the stand body.

14. The accessory case of claim 1, wherein the at least one hooking portion comprises at least one groove, and a movement of the stand with respect to the protective cover is fixed as the stand enters the second state and the at least one protrusion is inserted into the at least one groove.

15. The accessory case of claim 1, wherein the protective cover is formed of a plastic material.

16. An electronic device comprising:

a housing including a display disposed on a front side, and comprising a recess on a rear side; and a stand rotatably coupled to the housing about an axis of rotation, wherein the stand comprises, a stand body; and a protrusion protruding from at least one end of the stand body in a direction substantially parallel to the axis of rotation, wherein the housing comprises a hooking portion which is restrained to the housing, as the stand rotates from a first state to a second state, wherein the stand is mounted in the recess, such that the hooking portion and the protrusion are non-overlapping in the first state, wherein the stand is at least partially spaced apart from the recess in the second state, such that the protrusion is configured to overlap the hooking portion, and wherein the stand is restrained to the housing as the protrusion is engaged with the hooking portions.

17. The electronic device of claim 16, wherein the housing further comprises a bar crossing along a center portion of the recess, wherein the stand comprises a tongs-shaped gripper extending from the stand body and selectively force-fitted into the bar of the housing, thereby allowing the stand to rotate with respect to the housing.

18. The electronic device of claim 16, further comprising a stand cover detachable coupled to one end of the recess of the housing.

* * * * *